United States Patent [19]
Heise et al.

[11] Patent Number: 5,519,368
[45] Date of Patent: May 21, 1996

[54] COMPACT COIL ASSEMBLY FOR TRANSIENT VOLTAGE PROTECTION

[75] Inventors: James A. Heise, Cedar Falls; Gary A. Volesky, New Hall; Andy A. Haun, Cedar Rapids; Henry J. Zylstra, Alburnett, all of Iowa

[73] Assignee: Square D Company, Palatine, Ill.

[21] Appl. No.: 182,920

[22] Filed: Jan. 18, 1994

[51] Int. Cl.⁶ ................................................ H01H 73/00
[52] U.S. Cl. ............................... 335/18; 335/177; 361/42
[58] Field of Search ............................. 335/18, 177–179; 361/42–50

[56] References Cited

U.S. PATENT DOCUMENTS

| | | | |
|---|---|---|---|
| 3,018,418 | 1/1962 | Conrad | 335/18 |
| 3,975,721 | 8/1976 | Franz | 335/177 |

Primary Examiner—Lincoln Donovan
Attorney, Agent, or Firm—Larry I. Golden; Kareem M. Irfan

[57] ABSTRACT

A compact coil assembly is provided for protecting electrical components from transient voltage surges. The assembly includes a bobbin having a cylindrical core with two ends. A first and second flange are each perpendicularly mounted and extended outwardly from one of the ends. A lead pin is perpendicularly upstanding on the top surface of the first flange. The first flange has a parallel outer and inner wall defining a channel therebetween. The inner wall has a slot therethrough. The slot is open at one end to the top surface of the first flange and extends downward to the core. The slot is positioned on the top surface of the first flange opposite the lead pin. The channel extends from the lead pin across to the end of the slot near the core. The width of the channel and the slot are adapted for guiding a winding wire therethrough.

20 Claims, 2 Drawing Sheets

COMPACT COIL ASSEMBLY FOR TRANSIENT VOLTAGE PROTECTION

FIELD OF THE INVENTION

The present invention relates to coil assembly and more particularly, to a compact solenoid coil which protects ground fault circuits from transient voltage surges.

BACKGROUND OF THE INVENTION

The electrical systems in residential, commercial and industrial applications usually include a panelboard for receiving electrical power from a utility source. The power is then routed through overcurrent protection devices to designated branch circuits supplying one or more loads. These overcurrent devices are typically circuit interrupters such as circuit breakers and fuses which are designed to interrupt the electrical current if the limits of the conductors supplying the loads are surpassed. Interruption of the circuit reduces the risk of injury or the potential of property damage from a resulting fire.

Circuit breakers are a preferred type of circuit interrupter because a resetting mechanism allows their reuse. Typically, circuit breakers interrupt an electric circuit due to a trip condition such as a current overload or ground fault. The current overload condition results when a current exceeds the continuous rating of the breaker for a time interval determined by the trip current. The ground fault trip condition is created by an imbalance of currents flowing between a line conductor and a neutral conductor such as a grounded conductor, a person causing a current path to ground, or an arcing fault to ground.

An example of a ground fault interrupter is a fast acting circuit breaker that disconnects equipment from the power line when some current returns to the source through a ground path. Under normal circumstances all current is supplied and returned within the power conductors. But if a fault occurs and leaks some current to ground, then the ground-fault circuit interrupter (GFCI) will sense the difference in current in the power conductors. If the fault level exceeds the trip level of the GFCI, then the circuit will be disconnected. The trip level for protection of personnel is usually in the range of about 4 to 6 mA. The trip level for the protection of equipment is usually about 30 mA.

GFCI and other equipment often use solenoid coils for protection against electrical transients, particularly when electrical voltage clamps like metal oxide varistors (MOVs), zener diodes or spark gaps are used in the circuit. The coil must absorb the transient surge of both voltage and electrical energy in a short period of time, typically on the microsecond order. Should the transient voltage breakdown the coil, it could endanger other components of the circuit.

The ability of the coil to withstand voltage depends on the insulation between the coil's windings. In the conventional manufacture of a coil winding on a bobbin, a lead wire extends down along the side of the bobbin to the surface of the bobbin's core. Tape is usually placed over this lead wire for electrical insulation and to retain the lead wire as the coil is being wound. The lead wire is usually the area of initial voltage breakdown, however, because it extends from the top to the bottom of the layered winding's side.

There are further complications to improving the ability of the coil to withstand a transient voltage surge. To achieve a higher voltage rating, either the distance between the winding layers must be increased or a barrier must be inserted. As devices which carry the coil become increasingly smaller themselves, however, there is a need to achieve these protective characteristics in a more compact design.

In view of the increasing size restriction for coils and their devices, there is a need for a coil assembly with the ability to absorb transient voltage surges in a more compact design. There is another need for an inexpensively manufactured coil which can more effectively insulate the lead wire from the remainder of the coil winding to improve its ability to absorb transient voltage surges.

SUMMARY OF THE INVENTION

In accordance with the present invention, a compact coil assembly is provided for protecting electrical components from transient voltage surges. The assembly includes a bobbin having a cylindrical core with two ends. A first and second flange are each perpendicularly mounted and extended outwardly from one of the ends. The first and second flange each have a top surface opposite the end. A lead pin is perpendicularly upstanding on the top surface of the first flange. The first flange has a parallel outer and inner wall defining a channel therebetween. The inner wall has a slot therethrough. The slot is open at one end to the top surface of the first flange and extends downward to the core. The slot is positioned on the top surface of the first flange opposite the lead pin. The channel extends from the lead pin across to the end of the slot near the core. The width of the channel and the slot are adapted for guiding a winding wire therethrough.

The present invention also provides a ground fault circuit interrupter which includes a molded plastic casing and an electronic signal processor. The processor determines ground fault conditions within a protected circuit and provides an output signal to operate a pair of contacts to interrupt current flow through the circuit. The interrupter also includes a coil assembly of the type described above with a first and second winding around the core of the bobbin.

The present invention also provides a ground fault circuit protected against transient voltage surges. The circuit includes means for sensing a current imbalance between a line and neutral. An electronic signal processor determines ground fault conditions within a protected circuit and provides an output signal adapted to operate a pair of contacts to interrupt current flow through the circuit. The coil assembly is electrically connected to the protected circuit and to the electronic signal processor for absorbing voltage surges.

Accordingly, an object of the invention is to provide a coil assembly which uses multiple barriers to enhance the ability of the coil to absorb voltage surges.

Another object of the invention is to provide a coil assembly which increases the ability to absorb voltage surges in the same volume.

A further object of the invention is to provide a GFCI which is protected against electrical transients.

Yet another object of the present invention is to provide a coil assembly which protects an associated electrical device from harmful electrical transients.

Other and further advantages, embodiments, variations and the like will be apparent to those skilled in the art from the present specification taken with the accompanying drawings and appended claims.

BRIEF DESCRIPTION OF THE DRAWINGS

In the drawings, which comprise a portion of this disclosure.

DETAILED DESCRIPTION

Figure 1:
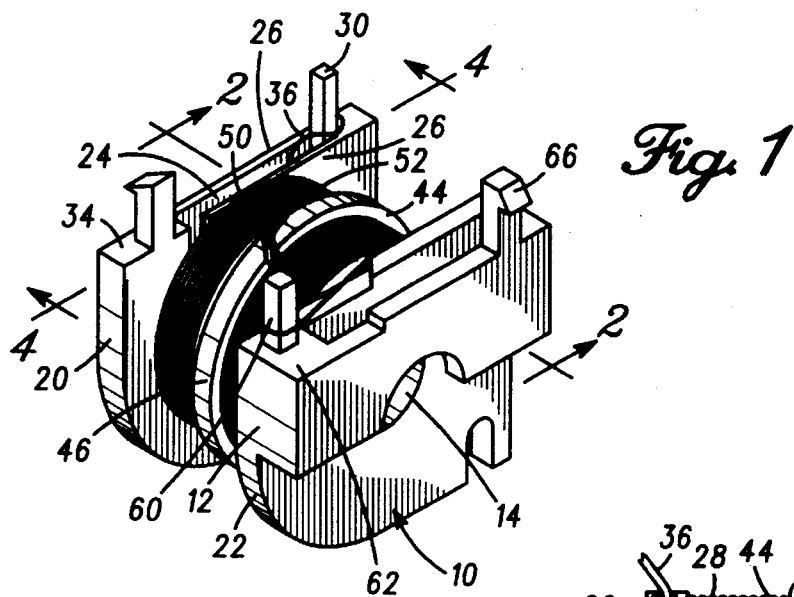
FIG. 1 is a perspective view of an embodiment of the present invention illustrating a compact coil assembly.
Figure 2:
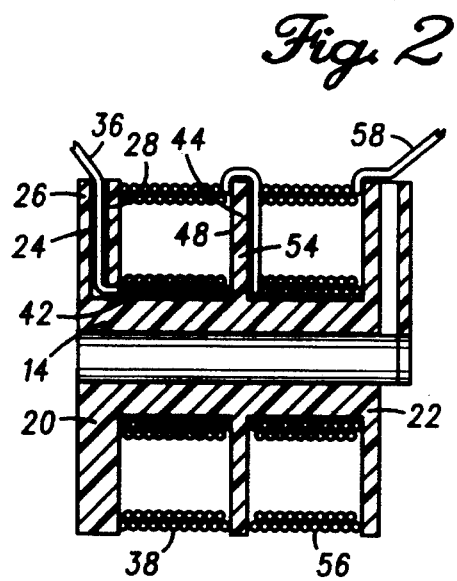
FIG. 2 is a cross-section view taken along lines 2—2 of FIG. 1.
Figure 4:
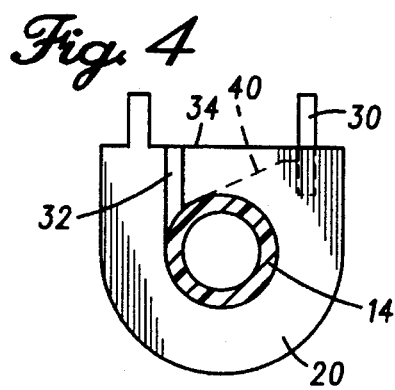
FIG. 4 is a cross-sectional view taken along lines 4—4 of FIG. 1.

A coil assembly 10 is depicted in FIGS. 1, 2 and 4 which includes a bobbin 12 having a generally cylindrical core 14 with two ends 16 and 18. A first flange 20 and second flange 22 are perpendicularly and integrally formed with respective ends 16, 18. The first and second flanges 20, 22 extend outwardly from the core 14 and are adapted to retain a coil winding therebetween.

The first flange 20 includes a channel 24 formed by an outer wall 26 and an inner wall 28. The channel 24 extends from a first lead pin 30 at one end to a slot 32 at the other end of the channel 24. The first lead pin 30 is mounted on a top surface 34 of the first flange 20. The slot 32 is formed through the inner wall 28 from the top surface 34 of the first flange to the core 14. The width of the channel 24 and the slot 32 is sufficient to accommodate a lead end 36 of a first winding 38.

The lead end 36 of the winding is electrically and mechanically connected to the first lead pin 30. The lead end 36 of the winding immediately extends along the channel 24 below the top surface 34 of the flange. A floor portion 40 of the channel is slanted downward towards the core 14 to guide the lead end of the winding into position at the core's surface 42.

The bobbin 12 preferably includes an electrically insulating barrier 44 integrally formed at one end with the core's surface 42. The barrier 44 has a top surface 46 upstanding perpendicularly from the core 14. The barrier 44 is positioned approximately midway between the core ends 16 and 18. The first winding 38 extends in overlapping layers from the inner wall 28 of flange on one side, to a side 48 of the barrier 44 on the other. The layers of the first winding 38 builds upon itself to extend near the top surface 46 of the barrier.

Once the first winding 38 is completed between the inner wall 28 and the barrier 44, the winding wire 50 extends over the top end 46 of the barrier through a slit 52 which retains the winding wire 50 in position below the top surface 46 of the barrier. The winding wire then extends down along another side 54 of the barrier to the surface 42 of the core. In a fashion similarly described above, a second winding 56 is formed in overlapping layers between the barrier 44 and the flange 22. The second winding 56 has a finish end 58 which extends from the top layer of the second winding 56 to a second lead pin 60 and is electrically and mechanically connected thereto. The flange 22 has a top surface 62 with an offset 64 to retain the finish end 58 of the second winding in an abutting relationship therewith. Mounting prongs like 66 are also attached to the top surfaces of the flanges 20, 22.

Figure 3:
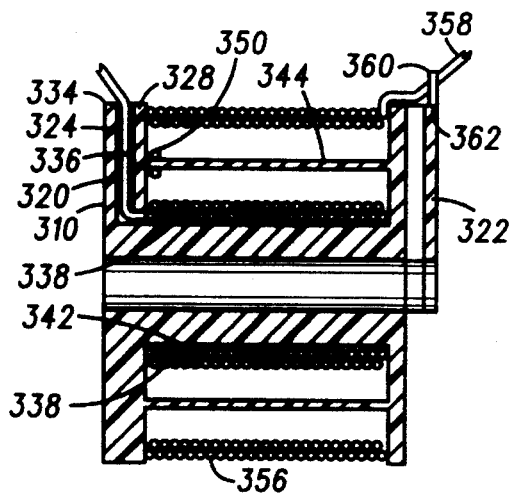
FIG. 3 is a cross-sectional view taken through the core of a bobbin similar to FIG. 2, illustrating an alternate coil assembly.

An alternate embodiment of a coil assembly 310 is contemplated by the present invention for the arrangement of a first and second winding 338 and 356, is illustrated in FIG. 3. As described above, a lead end 336 of the winding 356 is guided down a channel 324 to the surface 342 of the core. The first winding 338 extends in overlapping layers entirely across the area between the first and second flanges 320, 322. Once the first winding 338 is completed, it is covered by a layer of electrically insulating tape 344 to form a second type of barrier. A winding wire 350 continues upwardly along the inside surface of an inner wall 328 or the flange 322 and starts the second winding 356. Similarly, the second winding 356 extends in overlapping layers near the top surfaces 334, 362 of the respective flanges 320, 322. A finish lead 358 connects to a second lead pin 360 as described above.

A preferred embodiment of the coil assembly 10 includes approximately 1000 turns of 37 gauge magnetic wire having a heavy build insulation like NEMA type MW-75. The core diameter is about 0.186 inches. The first and second lead pins extend about 0.1 inches above the surface of the flanges. The overall height of the bobbin is about 0.5 inches.

The bobbin is made of an electrically insulating material like plastic. Preferably, the plastic used is a nylon or glass-filled nylon composite. A suitable manufacturing technique for making the bobbin is by injection molding.

Samples of the inventive coil assembly were tested to comply with Underwriters Laboratories (UL) 943 Class A for personnel protection and with UL 1053 Class 1 for equipment protection. In one of the tests the samples were subjected, a 6600 volt surge was applied across the power connections in accordance with IEEE 587. No damage to the device or arcing display was observed during the test with a let through current of no more than the average of 50 non-arcing units plus 10 amps.

Figure 5:
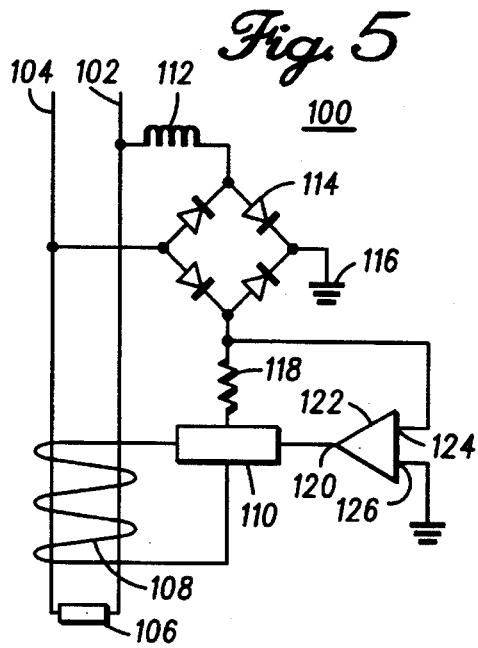
FIG. 5 is a schematic diagram of a circuit used in accordance with the present invention for protecting a ground-fault circuit from electrical transients with a coil assembly.

Generally, the inventive coil assembly is available for the protection of various circuits and electrical devices from damaging voltage impulses. One of the many applications of the present invention is its use with ground fault interrupters. Turning now to FIG. 5, a ground fault circuit 100 is illustrated. A service line 102 and a neutral line 104 are connected to a load 106. A current transformer 108 is provided to detect any imbalance in the current flowing through the line 102 and neutral 104.

The current transformer 108 outputs a signal to a GFCI control 110. The GFCI control 110 is a conventional type suitable for mounting with or connecting to an electronic trip circuit breaker, panelboard or the like (not shown).

A coil assembly 112, as described above, is connected on one end to the line 102 and on the other end to a rectifier 114. The rectifier 114 is also connected to a circuit ground 116 and returns to the neutral 104. The GFCI control 110 is connected to the rectifier 114 through a resistor 118 which provides voltage drop for the power supply. The coil assembly 112 acts as a standoff impedance and its ability to absorb voltage surges protects the GFCI control 110 from potential damage.

The GFCI control 110 is further connected to a gate 120 of a silicon-controlled rectifier (SCR) 122. The SCR 122 has an anode 124 which is connected to the rectifier' 114 and a cathode 126 which is connected to circuit ground. Other rectifying means are suitable for use with the present invention.

Figure 6:
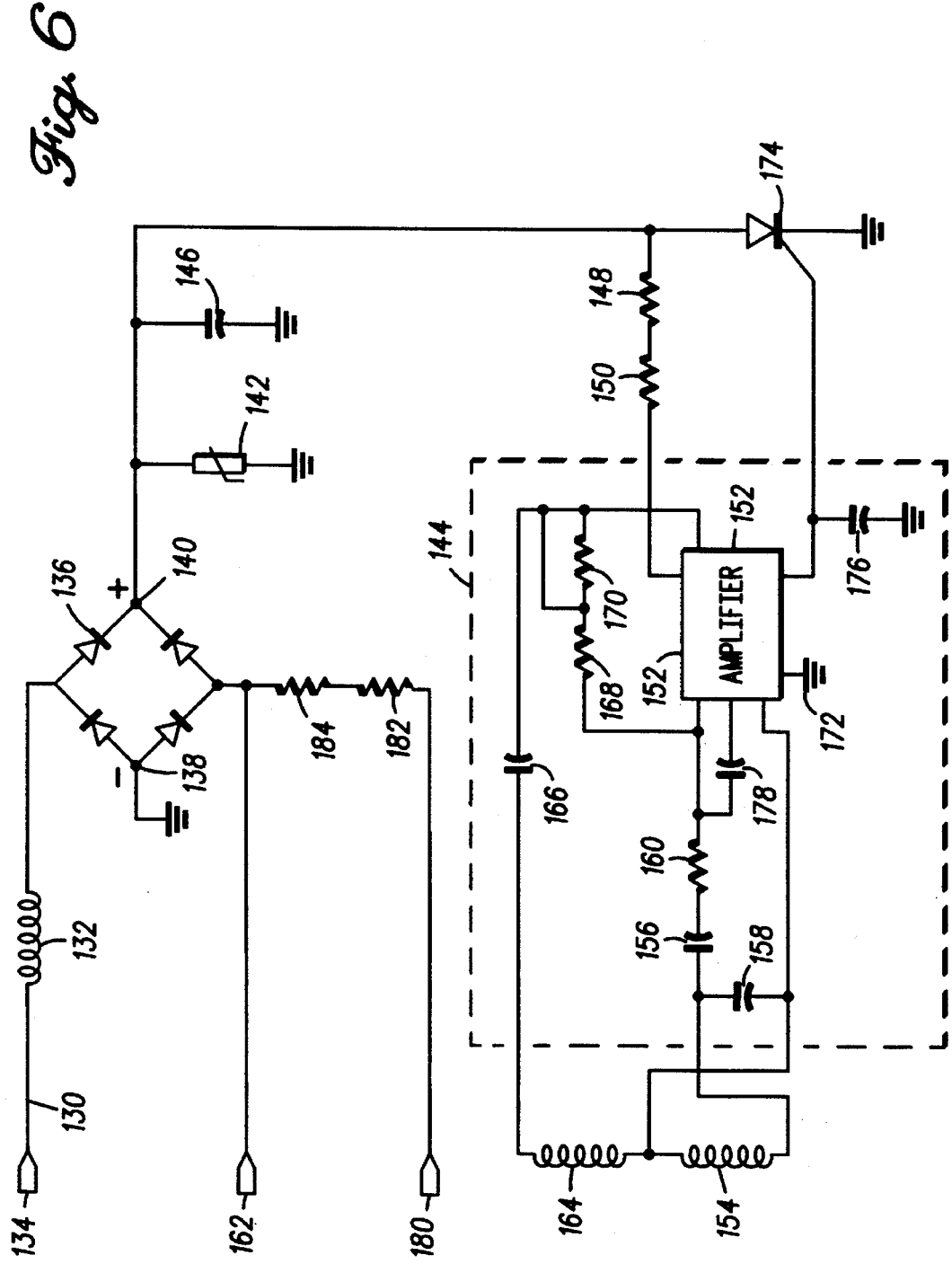
FIG. 6 is a schematic diagram of another circuit embodiment used in accordance with the present invention for protecting a ground-fault circuit from electrical transients with a coil assembly.

A preferred ground fault circuit 130 is illustrated in FIG. 6. A coil assembly 132, as described above, is connected to a service line 134 and to a rectifier 136. The rectifier 136 has a DC negative 138 which is connected to ground and a DC positive 140 which is connected to a MOV 142 for overvoltage protection. The invention contemplates using other means for overvoltage protection such as voltage clamping devices like zener diodes.

The coil assembly 132 is connected to a GFCI control 144 through a stabilizing capacitor 146 provided to filter the line voltage and reduce the zero voltage for a full wave. Resistors 148 and 150 are provided to drop the power into the GFCI control 144.

The GFCI control 144 includes an amplifier 152 which is connected to a sensing transformer 154 through capacitors 156 and 158 and resistor 160. The sensing transformer 154 detects an imbalance in the current between the line 134 and neutral 162 and generates a signal directed to the GFCI control 144.

A grounded neutral transformer 164 is also provided to prevent operation of the GFCI control 144 should the neutral 162 not be connected properly. The output of the amplifier 152 through a capacitor 166 the grounded neutral transformer 164 sets up an oscillation to simulate a ground fault if there is a short from the grounded neutral transformer 164 to the sensing transformer 154. The output of the amplifier 152 is also connected through resistors 168 and 170 to the inverted port of the amplifier 152 and the transformers 164 and 154.

The amplifier 152 is connected to a circuit ground at 172 and to an SCR 174 through a second stabilizing capacitor 176. The SCR 174 is connected to the rectifier 136 and also to a circuit ground. The amplifier 152 also connects a non-inverted port to the transformers 154 and 162 through capacitor 178.

The rectifier 136 is also connected to a test input 180. To simulate a ground fault, a current passes from the test input 180 through resistors 182 and 184 to the sensing transformer 154 which senses an imbalance artificially created for testing the GFCI control 144.

Two examples of the component values used for the circuit in FIG. 6 are provided. These examples are for illustrative purposes only and not intended to be limiting.

A first example is to provide protection for personnel from a fault in excess of about 5 mA. For a 120 volt line, the value of the MOV is 150 v. Capacitors 146 and 176 have a capacitance of 2200 pF at 200 v. Capacitors 58 and 178 have a value of 1000 pF. Capacitor 156 has a value of 6.8 uF. Capacitor 166 has a capacitance of 1500 pF. Resistors 148 and 150 have a value of 15 kOhm at 0.5 watt. Resistors 182 and 184 have a value of 7.5 kOhm at ½ watt. Resistors 168 and 170 have a value of 787 kOhm and 62 kOhm respectively, at ⅛ watt.

A second example is to provide protection for equipment from a fault in excess of about 30 mA. For a 120 volt line, the value of the MOV is 150 v. Capacitor 146 has a capacitance of 2200 pF at 200 v. Capacitors 158 and 178 have a value of 1000 pF. Capacitors 156 and 176 have a value of 6.8 uF. Capacitor 166 is not used in the circuit. Resistors 148 and 150 have a value of 15 kOhm at 0.5 watt. Resistors 182 and 184 have a value of 1.0 kOhm at ½ Resistors 168 and 170 have a value of 133 kOhm and 12 kOhm respectively, at ⅛ watt. The grounded neutral transformer 164 is not used in the circuit.

The coil assembly methodology and apparatus described above can be advantageously used for voltage surge protection of all types of GFCIs. Three types of GFCI are commonly available. The first or separately enclosed type is available for 120-volt 2-wire and 120/240-volt 3-wire circuits up to 30 amp. The second type combines a 15-, 20-, 25-, or 30-amp circuit breaker and a GFCI in the same plastic case. It is installed in place of an ordinary breaker in a panelboard and is usually available in 120-volt 2-wire, or 120/240-volt 3-wire types which may also be used to protect a 2-wire 240-volt circuit. The second type provides protection against ground faults and overloads for all outlets on the circuit. A third type having a receptacle and a GFCI in the same housing provides only ground-fault protection to the equipment plugged into that receptacle. There are feed-through types of GFCI which provide protection to equipment plugged into other ordinary receptacles installed downstream on the same circuit.

Examples of ground fault equipment are commercially available from the Square D Company under the catalog designations GROUND-CENSOR™, HOMELINE®, QO®, TRILLIANT®and MICROLOGIC® ground fault modules. This ground fault equipment is suitable for protection of main, feeder, and motor circuits on electrical distribution systems. It is also useable as ground fault relay and ground fault sensing devices.

While particular embodiments and applications of the present invention have been illustrated and described, it is to be understood that the invention is not limited to the precise construction and compositions disclosed herein and that various modifications, changes, and variations which will be apparent to those skilled in the art may be made in the arrangement, operation, and details of construction of the invention disclosed herein without departing from the spirit and scope of the invention as defined in the appended claims.

What is claimed is:

1. A compact coil assembly for protecting electrical components from transient voltage surges, the assembly comprising:

a bobbin having a cylindrical core with two ends;

a first and second flange each perpendicularly mounted and extending outwardly from one of the ends, the first and second flange each having a top surface opposite the end;

a lead pin perpendicularly upstanding on the top surface of the first flange;

the first flange having a parallel outer and inner wall defining a channel therebetween, the inner wall having a slot therethrough, the slot being open at one end to the top surface of the first flange and extending downward to the core, the slot being positioned on the top surface of the first flange opposite the lead pin, the channel extending from the lead pin across to the end of the slot near the core, the width of the channel and the slot adapted for guiding a winding wire therethrough.

2. The assembly of claim 1 wherein the bobbin further includes a barrier connected to the core and upstanding perpendicularly therefrom, the barrier having a top surface opposite the core and being positioned about midway between the first and second flanges.

3. The assembly of claim 2 wherein the top surface of the barrier comprises a slit extending across the width of the barrier, the width of the slit adapted to retain a winding wire therethrough.

4. The assembly of claim 1 wherein the assembly further includes a first and second winding around the core of the bobbin.

5. The assembly of claim 4 wherein the bobbin further comprises a barrier connected to the core and upstanding perpendicularly therefrom, the barrier having a top surface opposite the core and being positioned about midway between the first and second flanges, the top surface of the barrier having a slit extending across the width of the barrier, the first winding positioned between the first flange and the barrier, the first winding connected to the second winding by a winding wire extending through the slit in the top surface of the barrier, the second winding positioned between the barrier and the second flange.

6. The assembly of claim 4 wherein the first winding is positioned between the first and second flanges around the core, the assembly further comprises a barrier of electrically insulating tape wrapping over the first winding, the second winding positioned over the first winding and tape barrier between the first and second flanges.

7. The assembly of claim 1 wherein the top surface of the second flange comprises a second lead pin upstanding perpendicularly therefrom, the top surface having an offset near the second lead pin, the offset adapted to retain a winding wire therein.

8. A ground fault circuit interrupter for protecting a circuit, the interrupter comprising:

a molded plastic casing;

an electronic signal processor for determining ground fault conditions within a protected circuit and for providing an output signal to operate a pair of contacts to interrupt current flow through the circuit;

a coil assembly positioned within the case and electrically connected to the protected circuit and to the electronic signal processor for absorbing voltage impulses;

the coil assembly including a bobbin having a cylindrical core with two ends;

a first and second flange each perpendicularly mounted and extending outwardly from one of the ends, the first and second flange each having a top surface opposite the end;

a lead pin perpendicularly upstanding on the top surface of the first flange;

the first flange having a parallel outer and inner wall defining a channel therebetween, the inner wall having a slot therethrough, the slot being open at one end to the top surface of the first flange and extending downward to the core, the slot being positioned on the top surface of the first flange opposite the lead pin, the channel extending from the lead pin across to the end of the slot near the core, the width of the channel and the slot adapted for guiding a winding wire therethrough; and a first and second winding around the core of the bobbin.

9. The interrupter of claim 8 wherein the bobbin further comprises a barrier connected to the core and upstanding perpendicularly therefrom, the barrier having a top surface opposite the core and being positioned about midway between the first and second flanges, the top surface of the barrier having a slit extending across the width of the barrier, the first winding positioned between the first flange and the barrier, the first winding connected to the second winding by a winding wire extending through the slit in the top surface of the barrier, the second winding positioned between the barrier and the second flange.

10. The interrupter of claim 8 wherein the first winding is positioned between the first and second flanges around the core, the assembly further comprises a barrier of electrically insulating tape wrapping over the first winding, the second winding positioned over the first winding and tape barrier between the first and second flanges.

11. The interrupter of claim 8 wherein the top surface of the second flange comprises a second lead pin upstanding perpendicularly therefrom, the top surface having an offset near the second lead pin, the offset adapted to retain a winding wire therein.

12. A ground fault circuit protected against transient voltage surges, the circuit comprising:

means for sensing a current imbalance between a line and neutral;

an electronic signal processor for determining ground fault conditions within a protected circuit and for providing an output signal adapted to operate a pair of contacts to interrupt current flow through the circuit;

a coil assembly electrically connected to the protected circuit and to the electronic signal processor for absorbing voltage surges;

the coil assembly including a bobbin having a cylindrical core with two ends;

a first and second flange each perpendicularly mounted and extending outwardly from one of the ends, the first and second flange each having a top surface opposite the end;

a lead pin perpendicularly upstanding on the top surface of the first flange;

the first flange having a parallel outer and inner wall defining a channel therebetween, the inner wall having a slot therethrough, the slot being open at one end to the top surface of the first flange and extending downward to the core, the slot being positioned on the top surface of the first flange opposite the lead pin, the channel extending from the lead pin across to the end of the slot near the core, the width of the channel and the slot adapted for guiding a winding wire therethrough; and a first and second winding around the core of the bobbin.

13. The circuit of claim 12 wherein the bobbin further comprises a barrier connected to the core and upstanding perpendicularly therefrom, the barrier having a top surface opposite the core and being positioned about midway between the first and second flanges, the top surface of the barrier having a slit extending across the width of the barrier, the first winding positioned between the first flange and the barrier, the first winding connected to the second winding by a winding wire extending through the slit in the top surface of the barrier, the second winding positioned between the barrier and the second flange.

14. The circuit of claim 12 wherein the first winding is positioned between the first and second flanges around the core, the assembly further comprises a barrier of electrically insulating tape wrapping over the first winding, the second winding positioned over the first winding and tape barrier between the first and second flanges.

15. The circuit of claim 12 wherein the top surface of the second flange comprises a second lead pin upstanding perpendicularly therefrom, the top surface having an offset near the second lead pin, the offset adapted to retain a winding wire therein.

16. The circuit of claim 12 wherein the circuit further includes a first rectifying means connected between the coil assembly and the signal processor.

17. The circuit of claim 16 wherein the circuit further includes a second rectifying means connected to the signal processor and the first rectifying means.

18. The circuit of claim 12 wherein the circuit further includes a grounded neutral transformer connected to the signal processor, the line and the neutral.

19. The circuit of claim 12 wherein the signal processor comprises an amplifying means connected to the sensing means and the coil assembly.

20. The circuit of claim 12 wherein the circuit further comprises a voltage clamping means connected to the coil assembly and the signal processor.

* * * * *